Patented June 19, 1923.

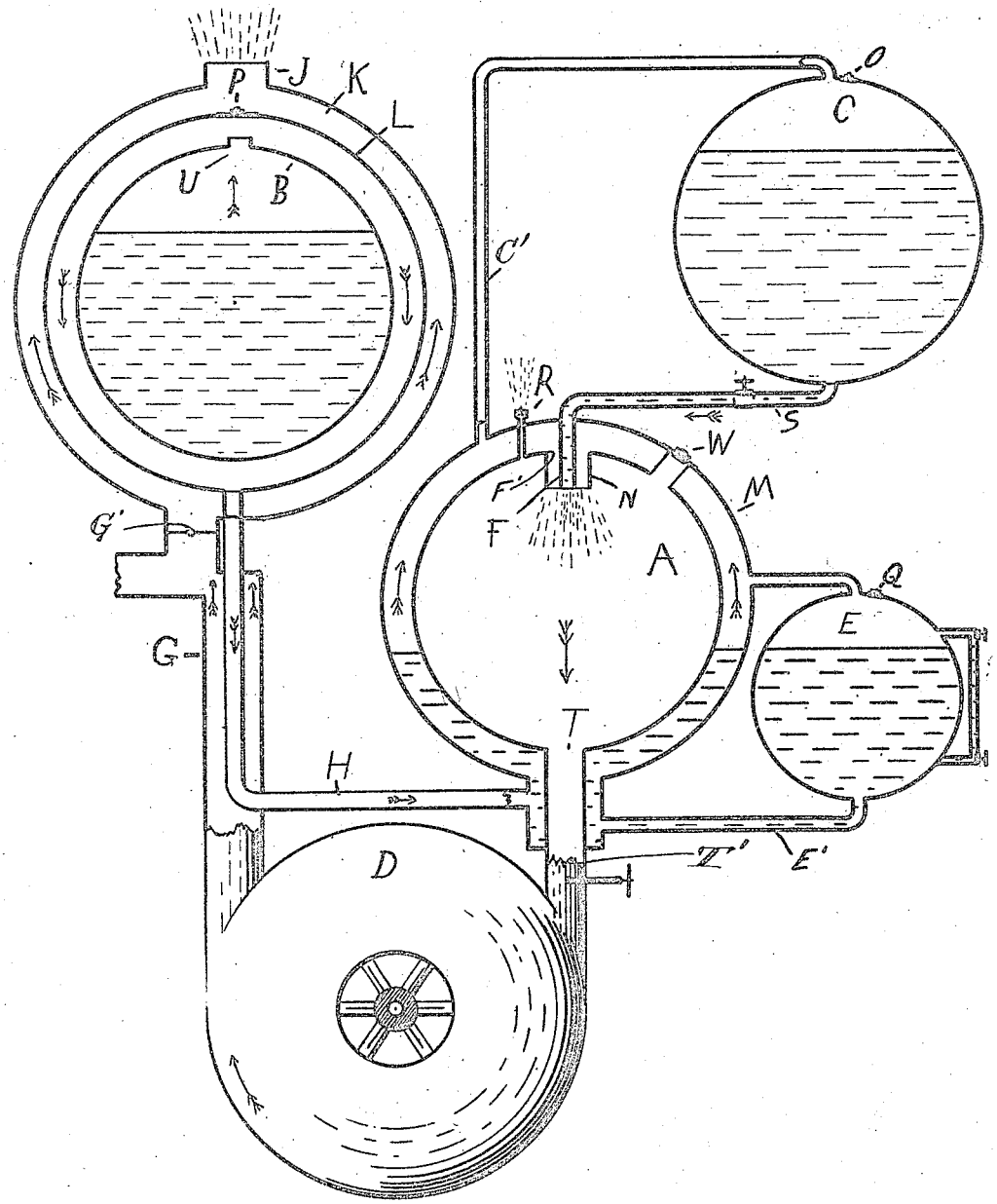

1,459,482

UNITED STATES PATENT OFFICE.

GEORGE T. UNDERWOOD, OF MAXWELL, CALIFORNIA.

LIQUID-FUEL BURNER.

Application filed June 9, 1919. Serial No. 302,769.

*To all whom it may concern:*

Be it known that I, GEORGE T. UNDERWOOD, a citizen of the United States, residing at Maxwell, in the county of Colusa and State of California, have invented new and useful Improvements in Liquid-Fuel Burners, of which the following is a specification.

This invention relates to means for burning liquid fuel for power (under a constant pressure greater than atmospheric pressure), and has for its object the production of an apparatus for harnessing the expansion of or pressure created by burning gases to utilize the pressure or expansion for driving a turbine or any other power transmitting mechanism.

Other objects and advantages of the invention will become apparent during the course of the following description.

In the accompanying drawing forming a part of the application "B" designates a liquid oxygen tank having a passage U in the top thereof whereby the oxygen gas will escape from the tank B into a gas chamber L which entirely surrounds the liquid oxygen tank. From this chamber, the oxygen gas is conveyed by suitable piping H to the lower end of a water tank M, which is supplied with water by the water reservoir E communicating with the lower end of the tank M by means of a conduit E'. The oxygen gas is moistened by passing up through the water contained in the tank M and is then directed through an opening F' in the nozzle N to combine with liquid fuel entering the combustion chamber A through a conduit F. It will be noted that the outlet end of the tank M extends into the opening F' and nozzle N of the combustion chamber and the opposite end of the tank M communicates with the bottom of the fuel tank C. A by-pass pipe C' communicates with the upper end of the water tank M and the upper end of the fuel tank to permit of the entrance of a certain amount of oxygen into the fuel tank to mix with the fuel contained therein. A safety release valve R is provided for the combustion chamber to prevent the pressure from rising to a dangerous point and to permit the apparatus to operate under other conditions.

The bottom of the combustion chamber A is provided with an outlet opening T which communicates with an engine D such as a rotary turbine by a conduit T'. The exhaust from the turbine passes up through an exhaust pipe G which is provided with a damper G' whereby the exhaust gas may be either exhausted to the atmosphere or to a heating chamber K surrounding the gas chamber L. The top of the heating chamber is provided with an exhaust opening J and directly thereunder the gas chamber L is provided with a closure whereby liquid oxygen may be entered into the tank B.

From the foregoing, it will be obvious that the exhaust gases from the engine may be admitted into the heating chamber to heat the liquid oxygen sufficiently to cause vaporization thereof. It will also be noted that the combustion chamber is partially submerged in the water contained in the water tank and consequently keeps the combustion chamber A at a comparatively low temperature. The combustion chamber is provided with a hand hole covered by a removable plug W whereby a match may be inserted into the combustion chamber to ignite the gaseous mixture entering through the inlet opening F.

As a gas is created by the oxygen vapor combining with the liquid fuel at the nozzle F, being ignited will burn in combustion chamber A. As there will be practically an endless supply of liquid fuel and oxygen vapor, the flame will continue to burn in the combustion chamber thereby creating a pressure therein. The burning gases will expand and pressure will be exerted on the rotor of the rotary turbine to cause the same to be set into motion. By the provision of the conduit T' all pressure in the combustion chamber is caused to be concentrated upon the rotor of the turbine so that movement will be imparted to the latter. The combustion chamber A will be maintained in as cool a space as possible by the water surrounding the same, but when the combustion chamber becomes intensely hot, it will heat the water in the jacket M and steam will be created which will combine with the oxygen vapor and be admitted into the combustion chamber to increase the combustible qualities of the gas created at the nozzle F.

What I claim as my invention is—

1. The combination of a combustion chamber, a water jacket surrounding the same; of an oxygen vapor chamber communicating with said water jacket whereby the vapor is caused to travel through the water therein, said combustion chamber having a nozzle communicating with the upper end of the water jacket, and means for supplying liquid fuel to the nozzle whereby a combustible gas is created in the combustion chamber and which is adapted to be ignited for creating pressure in said combustion chamber, and means for converting the pressure into mechanical energy.

2. The combination with a combustion chamber, a water jacket therefor having communication with the combustion chamber; of a liquid oxygen tank, a chamber surrounding said tank, means for conveying oxygen vapor from said chamber to the lower end of said water jacket, means for combining liquid fuel with the oxygen vapor in said combustion chamber whereby a pressure is created when the gas is ignited, means connected to said combustion chamber for converting the pressure into mechanical energy, and means connected to said last named means for heating the chamber surrounding the liquid oxygen chamber to promote the vaporization of the liquid oxygen.

3. The combination with a combustion chamber; of a liquid oxygen tank, an oxygen vapor chamber surrounding said liquid oxygen tank, means for conveying said oxygen vapor to the combustion chamber, an exhaust chamber surrounding the oxygen vapor chamber, means for combining the oxygen vapor in the combustion chamber with fuel for creating a combustible gas, means for converting the pressure created by the burning gases in said combustion chamber into mechanical energy, and an exhaust pipe communicating said last named means with the exhaust chamber whereby the vaporization of the liquid oxygen may be promoted when desired.

GEORGE T. UNDERWOOD.

Witnesses:
GEO. B. RECKERS,
FRANK T. RECKERS.